United States Patent [19]
Pancella

[11] 3,891,045
[45] June 24, 1975

[54] HYDRAULIC TRANSMISSION MOTOR VEHICLE

[76] Inventor: Vincent A. Pancella, 68 First Pl., Brooklyn, N.Y. 11231

[22] Filed: Apr. 5, 1974

[21] Appl. No.: 458,286

[52] U.S. Cl............................. 180/66 R; 180/6.48
[51] Int. Cl............................................ B60k 17/10
[58] Field of Search................ 180/66 R, 66 A, 6.48

[56] References Cited
UNITED STATES PATENTS

| | | | |
|---|---|---|---|
| 2,257,854 | 10/1941 | Peterson | 180/66 R |
| 2,431,719 | 12/1947 | Wilkin | 180/66 R |
| 3,055,445 | 9/1962 | Mendez | 180/6.48 |
| 3,303,901 | 2/1967 | Schou | 180/66 R |
| 3,363,709 | 1/1968 | Hukerikar | 180/6.48 |

Primary Examiner—Philip Goodman
Assistant Examiner—David M. Mitchell
Attorney, Agent, or Firm—Jacob L. Kollin

[57] ABSTRACT

A hydraulic transmission motor vehicle. Hydraulic power means are provided for driving hydraulic motors for operating the vehicle's wheels. Three-position open center directional valves are provided for controlling the forward and reverse speeds and for neutral position. Variable orifice bypass valves are coordinated with the three-position open center directional valves for controlling the speed of the motors. An internal combustion engine having constant driving and idling speed carburetors is employed to operate the hydraulic power means. A fixed displacement pump is employed as hydraulic power means, as well as fixed displacement hydraulic motors.

8 Claims, 10 Drawing Figures

PATENTED JUN 24 1975　　　3,891,045

SHEET 1

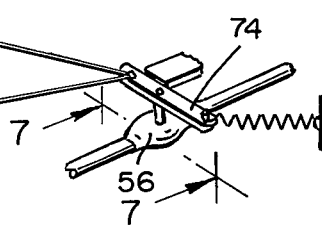
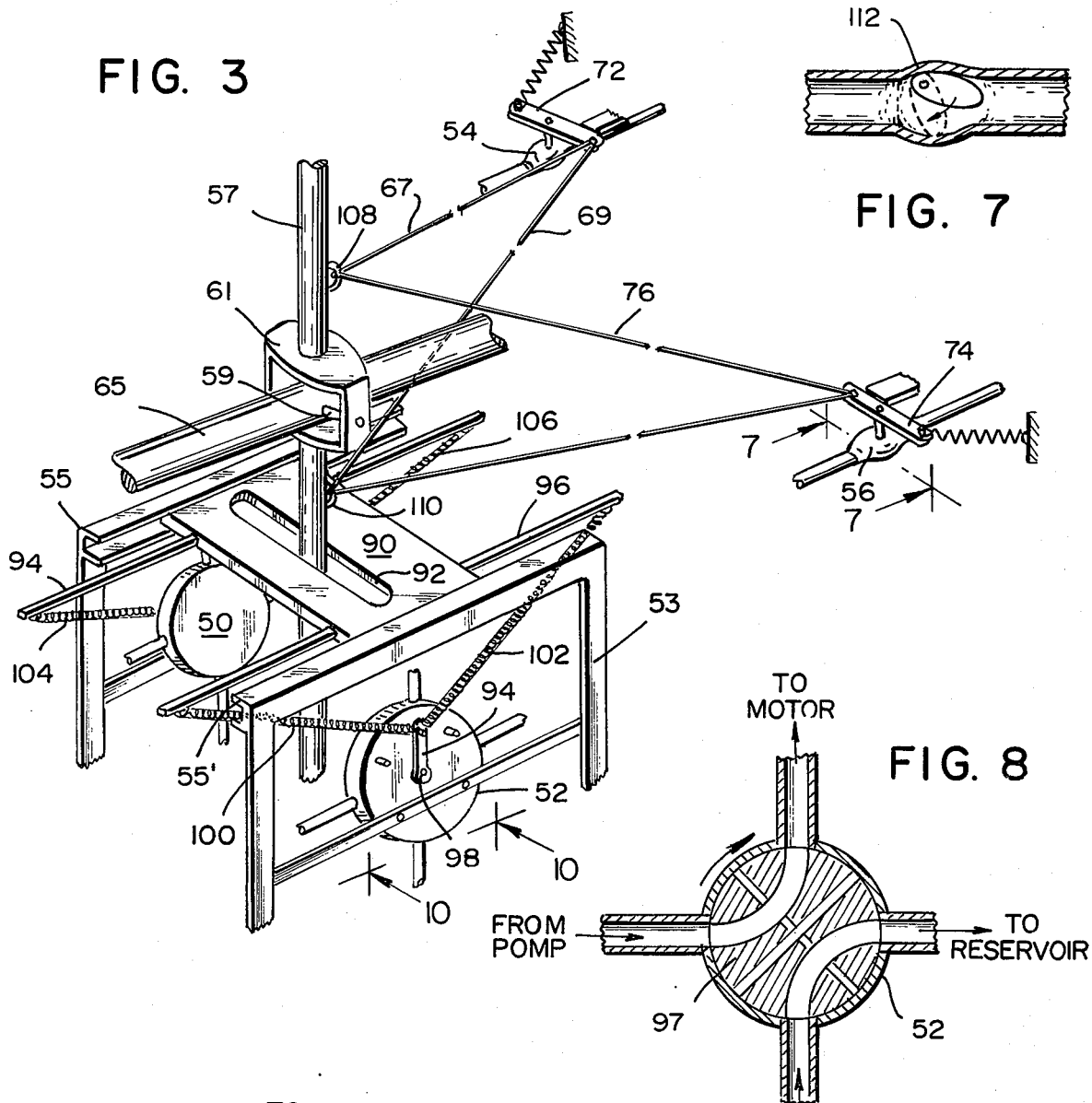
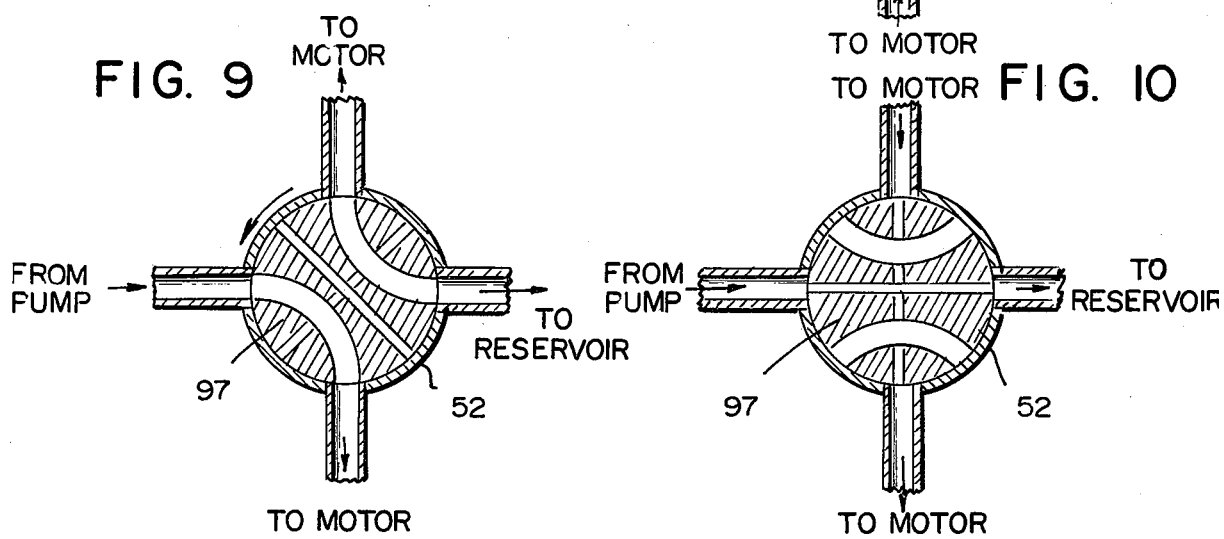

HYDRAULIC TRANSMISSION MOTOR VEHICLE

BACKGROUND OF THE INVENTION

The invention relates to a hydraulically operated vehicle having novel drive, steering and operating means.

An important object of the invention is to provide a simple bypass speed control system wherein the speed is controlled by the transmission.

Another important object of the invention is to provide a vehicle of the above character wherein an internal combustion engine is operated at its single most efficient speed, thereby reducing pollution.

Still another object of the invention is to provide a vehicle of the above character in which the driving and steering steps are controlled by a single control member.

Yet another object of the invention is to provide a vehicle of the above character wherein the vehicle's movement may be arrested on a hill or other terrain by cutting off all flow of fluid to the hydraulic motors.

These and other objects of the invention will become apparent from the following description in connection with the appended drawing illustrating a preferred embodiment of the invention. It is to be understood, however, that these are given by way of illustration and not of limitation and that changes may be made in the detail construction, form and size of the parts, without affecting the scope of the invention sought to be protected.

In the drawings:

FIG. 3 illustrates the control mechanism of the hydraulic system;

FIG. 7 is a detail of one of the gate valves of the pair of variable orifices used in the mechanism;

FIG. 8 shows one of a pair of three-position open center directional valves used in the hydraulic system, set for forward driving;

FIG. 9 shows the valve of FIG. 8 set for reverse driving;

FIG. 10 shows the valve of FIG. 8 set in neutral position.

Figure 1:
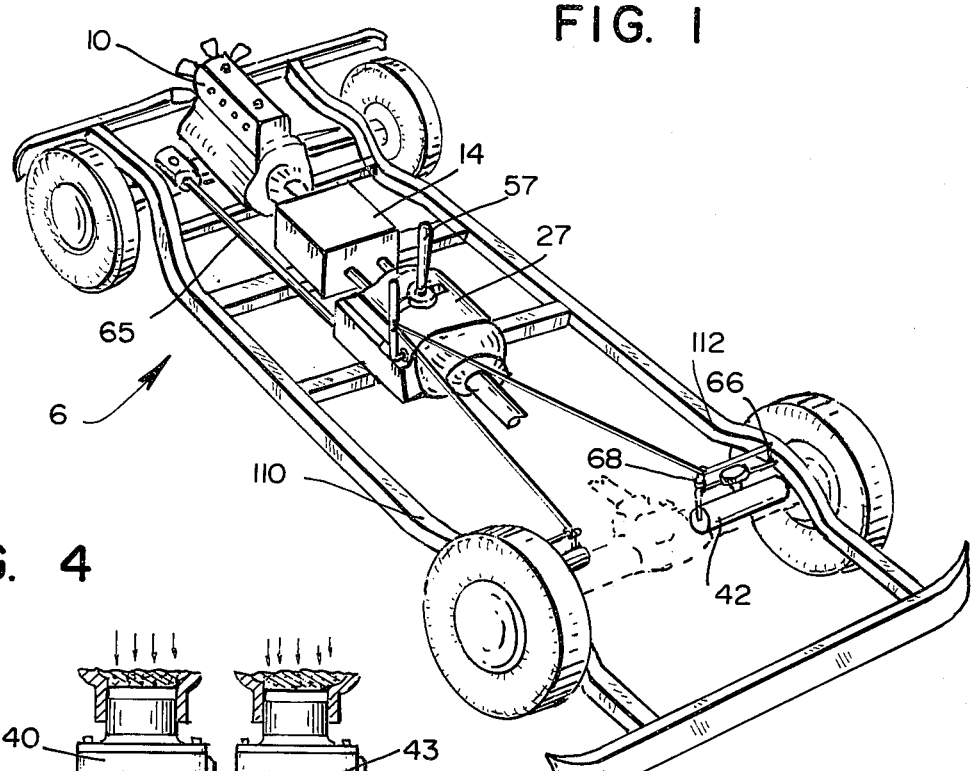
FIG. 1 is a perspective view of the motor vehicle according to the invention.

Referring now to the drawing in detail, the motor vehicle generally indicated by the numeral 6, comprises a chassis 8, an internal combustion engine operably connected by a shaft 11 with a hydraulic fixed displacement pump 12 mounted in a housing 14. The housing also contains oil reservoir 16, oil cooler 18, pressure relief valve 20, filter 22 and pressure accumulator 24.

The control mechanism for the fixed displacement motors 42.44 is mounted in another housing 27 and includes an equalizer 28 connected to the outlet end of accumulator 24 by pipes 30, from which also branches off a pipe 32 for pressure gauge 34. Another branch pipe 36, leading from pipe 30, connects the pressure system to a device 38 for controlling the operation of a pair of carburettors 40, 42 of engine 10, in a manner to be described hereinafter.

A pair of hydraulic motors 42, 44, one of which can also be seen in FIG. 1, are operably connected with equalizer 28 through three-position open center directional valves 50,52 and to the inlet ends of variable orifice valves 54, 56, respectively. The valves 50, 52 are employed to provide forward and reverse speeds, as well as a neutral position.

The direction valves 50, 52 are mounted on either side of a frame 53 (FIG. 3) which is enclosed by the housing 27. The frame is constructed with tracks 55, 55' in which is slidable a plate 90 having a transverse slot 92 and a pair of booms 94,96. A control stick 57 for controlling the direction valves 50,52 and variable orifice valves 54,56 is secured to a gimbal 61 pivoted at 59 on the vehicle steering shaft 65 partly shown in FIG. 3 and connected to a conventional front wheel steering mechanism partly shown in FIG. 1. The control stick can thus be moved forward, rearward with the plate 90, or transversely, left or right in the slot 92.

Each of the valves 50, 52 is provided with a lever such as 94, having one end secured axially of the valve disk 97 by means of a pivot pin 98 extending through the valve housing. Springs 100,102, 104,106 connect the ends of each of such levers to opposite ends of booms 94,96, respectively, as shown in FIG. 3.

Secured with one of their ends at 108,110 to the control stick above and below the gimbal 61 are pairs of cables 67,69 and 76,77. The other ends of these cables are attached to levers 72,74 which operate gates 112 of variable orifice valves 54,56. A cross-section of one of these valves is shown in FIG. 7.

When the control stick 57 and with it plate 90, booms 94, 96 and wires such as 100,102,104 are moved forward the levers such as 94 of the directional valves 54,56 attached to these wires will shift forward, placing these valves into the position shown in FIG. 8. Simultaneously, the wires 67,76 will pull on the levers 72,74, gradually closing the variable orifice valves 54,56. Forward speed will keep increasing as the valves are being closed.

The orifice valves' opening and closing is also proportional to the extent of steering. The arrangement of the cables is such that if a left turn is made by moving the control stick 57, in slot 92 to the left, the variable orifice valve to the right of the control stick will close more than that to the left thereof, thus increasing the supply of oil to the right wheel motor and speeding it up and obviating a separate differential.

There are further provided, at the motors, on-off valves 62,64,66,68, which provide parking brake and emergency parking in case of leakage. These valves are operated by means of an emergency control handle 80 near the driver's seat through cables 82 and 84. When these valves are closed, the flow of oil in and out of the motors is arrested, whereby the oil restrains the rotation of the motor's vanes.

In operation, the motor vehicle engine 10 is started thus causing the pump 2 to deliver oil under pressure, through pressure accumulator 24 to variable orifice valves 54,56. With the control stick 57 in upright (neutral) position (FIG. 3) the valves 50, 52 are in neutral open position (FIG. 10) as are the variable orifice valves 54,56, as illustrated in FIG. 7, with the gate valve 112 open. The oil delivered from the equalizer 28 flows through the open variable orifice open valves 54,56 three-way open center directional valves 50,52 line 58, oil cooler 18 to reservoir 16. The motors 42,44 are thus non-operative.

When the control stick 57 is pulled back it will first pass through a neutral position described above, in which the orifice valves 54,56 will be wide open, then reverse the directional valves 50,52, into the position shown in FIG. 9 by moving the valve levers, such as 94 backward by means of cables such as 100,102, while gradually closing the variable orifice valves 54,56, and eventually reversing the directional motors 42,44. Normal braking is thus accomplished by this means.

Figure 4:
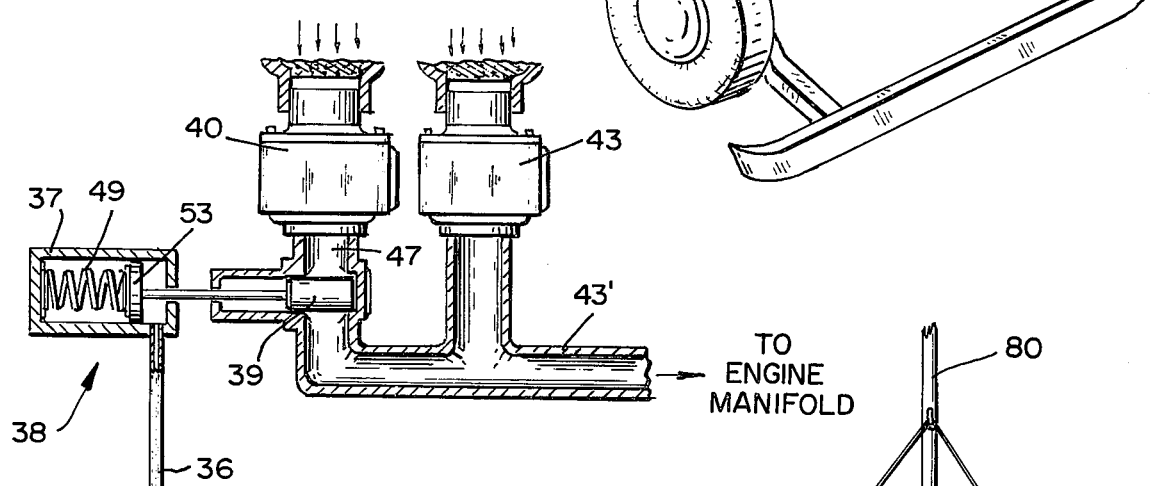
FIG. 4 shows the carburators and the control device employed therewith.

The engine 10, for operating pump 2 employs two carburettors 42,43, set to operate the engine at constant speeds respectively. Carburettor 40 is set for driving speed, while carburettor 43 is set for idling speed. Both carburettors have a common conduit 43' to the engine's manifold. A slide valve 39 maintains the passage 47 open when oil under pressure pushes the piston 53 against the bias of spring 49 in cylinder 37, i.e. when motors 42 and 44 are in operation and oil flows under pressure through line 36. When the motor vehicle is brought to a stop be relieving the oil pressure in the system the piston 53 is pushed to the right in FIG. 4 and slide valve 45 closes the passage 47. However, the engine 10 continues in operation through idling carburetor 43.

Figure 5:
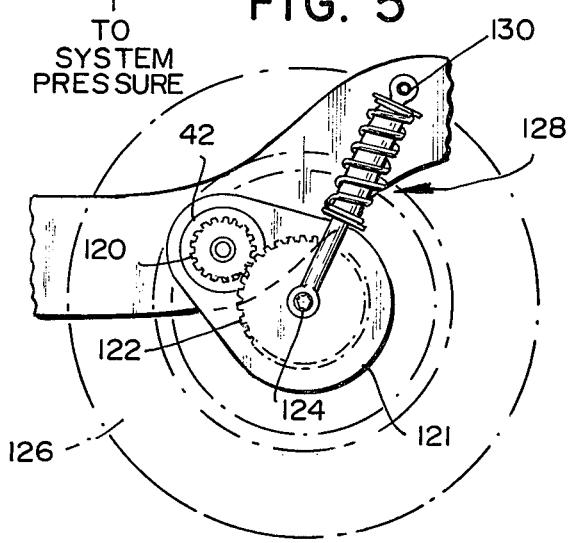
FIG. 5 is a detail illustrating the device.
Figure 6:
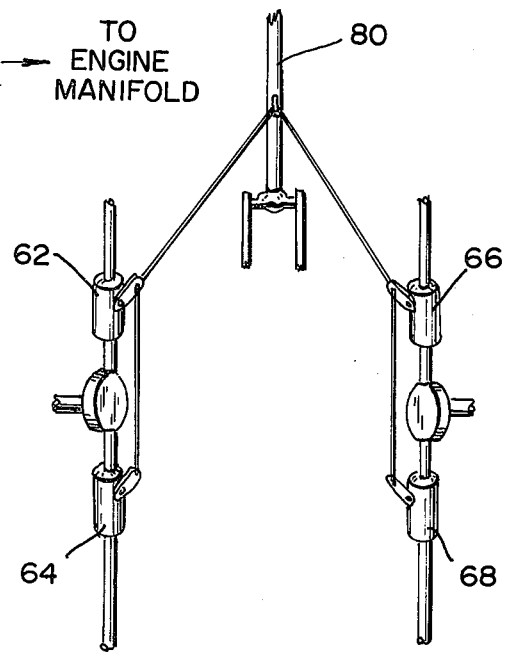
FIG. 6 illustrates the emergency braking system of the vehicle.
Figure 2:
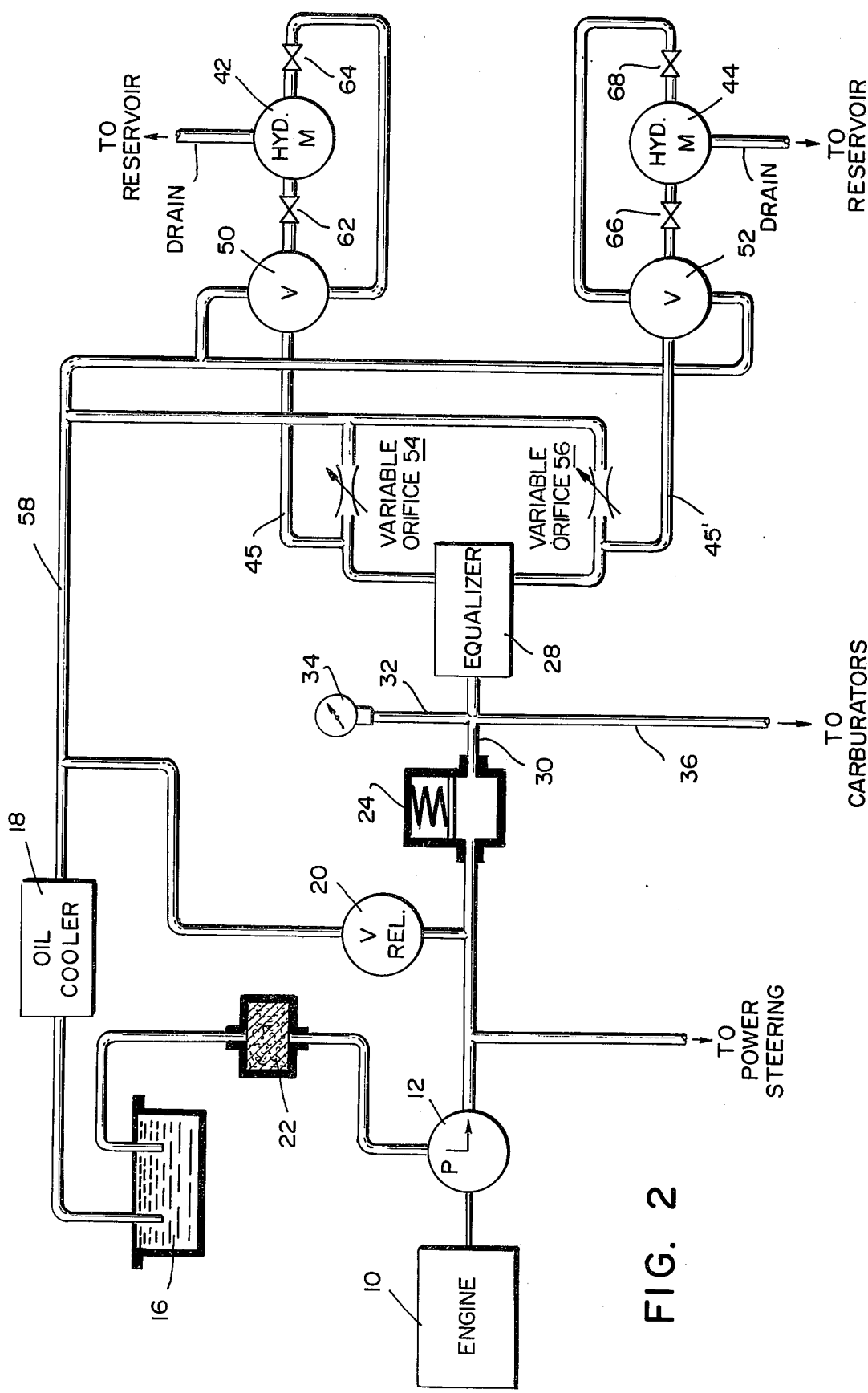
FIG. 2 is a schematic representation of the elements of the drive and braking mechanism of the vehicle.

The mounting and driving connection of the motors to the vehicle is shown in FIG. 5. Each of the motors 42,44 is mounted on respective ends 110,112 of the chassis frame 8 As seen in this Figure, motor 42 is provided with a gear 120, mounted in gear box 121 and which is in driving engagement with a gear 122 secured to the axle 124 of the vehicle wheel 126. Pivoted on the axle is one end of shock absorber 128 the other end of which is secured to the chassis frame at 130.

I claim:

1. A hydraulic transmission motor vehicle comprising a wheel chassis, a pair of ground engaging wheels for said chassis hydraulic motor means for driving said wheels, hydraulic power means for driving the motor means, control means for controlling said hydraulic power means, combustion power means for operating said hydraulic power means, control means for said combustion power means, and brake means for locking the hydraulic motor means in an immovable position, a frame mounted on said chassis, said control means for controlling said hydraulic power means including a pair of three-position open center directional valves mounted on either side of said frame, said three-position open center directional valves being connected to said hydraulic power means and said hydraulic motor means, a pair of bypass variable orifice valves mounted on said chassis said orifice valves being located in conduits which by-pass said motor means, diverting the pressure fluid back to the hydraulic power means and provided with levers, respectively, and connected intermediate said hydraulic power means and said three position open center directional valves, a control stick displaceable in forward, neutral reverse and left and right directions, means operably connecting said stick to said three-position open center directional valves, means operably connecting said stick to said bypass variable orifice valves, respectively, said connecting means being arranged to open and close said bypass orifice valves proportionally to the steering direction said connecting means comprising a pair of upper cables each having one end secured to an upper end of said stick and one end to one of said levers, respectively, a pair of lower cables secured to the lower end of said stick and one end, respectively, to said levers, said control stick when moved forward or backward restricting the by-pass flow, thereby increasing the power applied to the wheel motors, said control stick, when moved to one side, effecting a restriction of the by-pass flow from the wheel motor disposed on the opposite side.

2. The vehicle as claimed in claim 1, said frame being provided with a pair of spaced horizontal tracks, a pair of booms slidable on said tracks, a plate slidable in forward and rearward directions and secured to said booms, said plate having a slot transverse to said pair of rails, a vehicle steering shaft mounted in said chassis, said steering shaft being connected to a conventional front wheel steering mechanism, a gimbal pivoted on said vehicle steering shaft, said control stick being secured to said gimbal and having a lower end extending through said slot.

3. The vehicle as claimed in claim 2, wherein said three-position open center valves have exterior levers, said means operably connecting said control stick to said three-position open center directional valves are two pairs of springs, one end of each of said pairs of springs being secured to opposite ends of said booms, the other end of each of said springs being secured to said levers, respectively of said pair of three-position open center valves.

4. The vehicle as claimed in claim 3, wherein said variable orifice valves are gate valves having exterior levers for opening and closing said gate valves, said means operably connecting said control stick and said gate valves, being two pairs of wires having one of their ends secured to said control stick, the others of their ends secured to said exterior levers for opening and closing said valves.

5. The vehicle as claimed in claim 4, further provided with pairs of on-and -off valves at the inlet and outlet of each of said hydraulic motor means for stopping the flow of oil through said hydraulic motor means, a brake lever mounted on said chassis and means operably connecting said brake lever with said on-and-off valves.

6. The vehicle as claimed in claim 5, wherein said hydraulic power means for driving said power means comprises a rotary hydraulic pressure pump, a pressure accumulator connected to the outlet of said pump and an equalizer connected intermediate said pressure accumulator and said three-position open center directional valves.

7. The vehicle as claimed in claim 6, wherein said combustion power means, is an internal combustion engine provided with a manifold and with an idling speed carburetor and a driving speed carburetor, both of said carburetors having a common conduit to said manifold, a slide valve for opening and closing the path from said driving speed carburetor to said common conduit, a cylinder connected to said hydraulic power means for fluid communication therewith, a piston in said cylinder, a rod connecting said piston and said slide vavle, a coil spring biasing said piston for closing said slide valve, said piston being displaceable against the bias of said spring by hydraulic pressure of said hydraulic power means when said hydraulic power means are in operation.

8. The vehicle as claimed in clain 1, wherein said hydraulic motor means are fixedly mounted on said chassis, each of said motors having a drive gear, each of said wheels having an axle provided with a driven gear in engagement with said drive gear, a shock absorber pivoted with one end on said axle, the other end of said axle being pivoted to said chassis.

* * * * *